（12）United States Patent
Newport et al.

(10) Patent No.: US 8,041,690 B2
(45) Date of Patent: Oct. 18, 2011

(54) STORING INFORMATION FOR DYNAMICALLY ENLISTED RESOURCES IN A TRANSACTION

(75) Inventors: William Thomas Newport, Rochester, MN (US); John Joseph Stecher, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 308 days.

(21) Appl. No.: 12/360,194

(22) Filed: Jan. 27, 2009

(65) Prior Publication Data

US 2010/0191706 A1   Jul. 29, 2010

(51) Int. Cl.
*G06F 17/30* (2006.01)
(52) U.S. Cl. ........................................ 707/703
(58) Field of Classification Search .................. 707/202, 707/703; 717/251; 709/207
See application file for complete search history.

(56) References Cited

U.S. PATENT DOCUMENTS

| | | | | |
|---|---|---|---|---|
| 2005/0193222 | A1* | 9/2005 | Greene | 713/201 |
| 2005/0262215 | A1* | 11/2005 | Kirov et al. | 709/207 |
| 2006/0136887 | A1* | 6/2006 | Kaczynski et al. | 717/151 |

* cited by examiner

*Primary Examiner* — Etienne Leroux
(74) *Attorney, Agent, or Firm* — Wood, Herron & Evans, LLP

(57) ABSTRACT

A method, apparatus and program product dynamically enlist a plurality of resources to be committed by a transaction during execution of the transaction and store information about each enlisted resource in the plurality of resources with the transaction in a transaction log, including information about a state of each resource, to facilitate recovery of the transaction. Enlisting and storing may be performed during the execution of the transaction, and the resources to be committed by the transaction may be unknown prior to execution of the transaction. By doing so, a more complete record of all the resources that were enlisted during runtime may be maintained.

27 Claims, 4 Drawing Sheets

STORING INFORMATION FOR DYNAMICALLY ENLISTED RESOURCES IN A TRANSACTION

FIELD OF THE INVENTION

The invention relates to computers and computer systems, and in particular, to the processing of transactions.

BACKGROUND OF THE INVENTION

Databases are used to store information for an innumerable number of applications, including various commercial, industrial, technical, scientific and educational applications. Many databases are relational databases, which organize information into formally-defined tables consisting of rows (i.e., records) and columns (i.e., fields), and which are typically accessed using a standardized language such as Structured Query Language (SQL). Database management systems (DBMS's) are the computer programs that are used to access the information stored in a database via searches or queries against the database, and to modify the information stored in the database.

Databases are often enlisted to process transactions. Transactions include indivisible operations that must be fully completed or must be fully aborted. A typical transaction is a banking transaction for moving money from one account to another. This transaction typically includes at least two indivisible operations such as removing money from one account and adding money to the other account. The operations are indivisible because both of them must be successfully completed to maintain the accuracy of the two accounts.

If all the operations are successfully completed, then the computer system "commits" the transaction, for example, via an SQL COMMIT statement. By committing, all the changes are made permanent in the database containing the account information. However, if an error occurs (e.g., due to a computer crash) and an operation cannot be completed, the computer system rolls back all of the operations, including any successfully completed operations, via an SQL ROLLBACK statement, to undue all the changes. As such, the database containing the account information may be restored to its known, original state prior to the transaction.

Many modern computer systems are distributed systems, and as such, transactions are also distributed. A typically distributed system is a client-server. The client-server is a type of distributed network architecture, which enables a client to make a request to a server. The client is often a single user computer or a program running on the same, while the server is often a multi-user computer or a program running on the same. After receiving the request, the server (e.g., an application server) will process the request and typically generate a response back to the client. A server is typically located remotely from a client and can process requests from multiple clients.

One type of distributed transaction processing architecture capable of being used in client-server systems is referred to as the X/OpenXA standard. In XA transactions, multiple resource managers on multiple clients interact with their associated XAResources, which are also on the clients, and a transaction manager on a server typically handles the execution of transactions. The transaction manager typically handles the execution of multiple transactions as part of a global transaction. In particular, the transaction manager enlists the XAResources, communicates with the resource managers about the XAResources, and maintains a serialized transaction log of all the XAResources that are enlisted. An XA resource is typically any resource that can be utilized with XA such as a database, main frame, messaging service, etc.

Typically each XAResource that is enlisted by a transaction is explicitly configured, with information about the XAResource (e.g., XAResource and XAResourceInfo) stored once in the transaction log of the transaction manager at the beginning when the XAResource is first enlisted and then the information is referenced each time the transactions enlist that XAResource. Regardless of the resources enlisted, all the operations must still be committed or rolled back. To ensure that this occurs, a two-phase commit (2PC) protocol is often implemented. In the first phase, the transaction manager orders the resource managers to prepare to commit the enlisted XAResources. Depending on whether or not all the resource managers are successful, the transaction manger tells the resource managers to commit or roll back the operations on the XAResources in the second phase. To complete the processing, the resource managers associated with the XAResources are inflated to invoke (a) prepare and (b) commit or rollback (i.e., 2PC). If committed, the resource managers then contact the XAResources and the specified operations (e.g., an SQL verb) are performed on the XAResources. This is generally illustrated in FIG. 4 with two XAResources (i.e., XA1 resource at connection conn1 and XA2 resource at connection conn2).

In case the transaction needs to be recovered, the transaction log may be utilized to determine which XAResources were enlisted. After they are identified, the resource managers associated with those XAResources may be contacted to perform 2PC on those resources. Specifically, the transaction manager stores a serializable factory that can be used to return the XAResource instances. The transaction manager serializes the factory and when required, inflates it, obtains a XAResource instance, and then calls 2PC.

However, often times a XAResource serves as a proxy for other XAResources and generally represents other XAResources. For example, the XAResource may be a virtual resource such as a virtual database that is partitioned across hundreds of separate computers (e.g., over a grid of thousands of server computers). Databases are often partitioned across many computers to improve efficiency, to perform maintenance of a portion of the database, etc. However, conventional techniques assume that the XAResource that was enlisted in the transaction log is the XAResource that will be utilized during execution. As such, XAResources represented by the resource in the transaction log are generally not included in the transaction log. Moreover, it may not be until runtime, after execution of the transaction has begun and at commit time that the exact XAResources that are being enlisted will be known and cannot be preconfigured, instead, only the proxy might be preconfigured. As such, this may cause errors, bottlenecks, and may hinder recovery of the transaction because there may be no record of the actual XAResources enlisted. Furthermore, even if some of these resources were known, it may not be efficient to try to configure all of them.

As an example, suppose there are ten resource managers associated with ten virtual databases that represent other resources. There is also a transaction and a subset of those virtual resources will be selected for the transaction. As such, the selected subset of virtual resources may be preconfigured, enlisted, and entered in the transaction log of the transaction manager. The transaction log typically does not indicate any of the other resources represented by the virtual resources that were enlisted. Moreover, the transaction manager will generally incorrectly operate under the impression that the resources in the transaction log are the only ones being utilized to execute the transaction. Even the resource managers associated with the selected subset of virtual resources generally have no way to determine which resources represented by the virtual resources were actually enlisted during runtime.

A need therefore exists for an improved manner of processing transactions, in particular, an improved manner of keeping track of the resources that are dynamically enlisted to execute a transaction and not known before runtime.

BRIEF SUMMARY OF THE INVENTION

The invention addresses these and other problems associated with the prior art by providing a program product, an apparatus, and a method that dynamically enlist a plurality of resources to be committed by a transaction during execution of the transaction and store information about each enlisted resource in the plurality of resources with the transaction in a transaction log, including information about a state of each resource, to facilitate recovery of the transaction. Enlisting and storing may be performed during the execution of the transaction, and the resources to be committed by the transaction may be unknown prior to execution of the transaction. By doing so, a more complete record of all the resources that were enlisted during runtime may be created, and the record is indicative of resource information per transaction.

These and other advantages and features, which characterize the invention, are set forth in the claims annexed hereto and forming a further part hereof. However, for a better understanding of the invention, and of the advantages and objectives attained through its use, reference should be made to the Drawings, and to the accompanying descriptive matter, in which there is described exemplary embodiments of the invention.

DETAILED DESCRIPTION OF THE INVENTION

Embodiments consistent with the invention may dynamically enlist a plurality of resources to be committed by the transaction during execution of the transaction and store information about each enlisted resource in the plurality of resources with the transaction in a transaction log, including information about a state of each resource, to facilitate recovery of the transaction. The transaction may be an XA transaction and the resources may be XAResources, although the invention is not so limited to use with XA distributed transactions.

Figure 1:
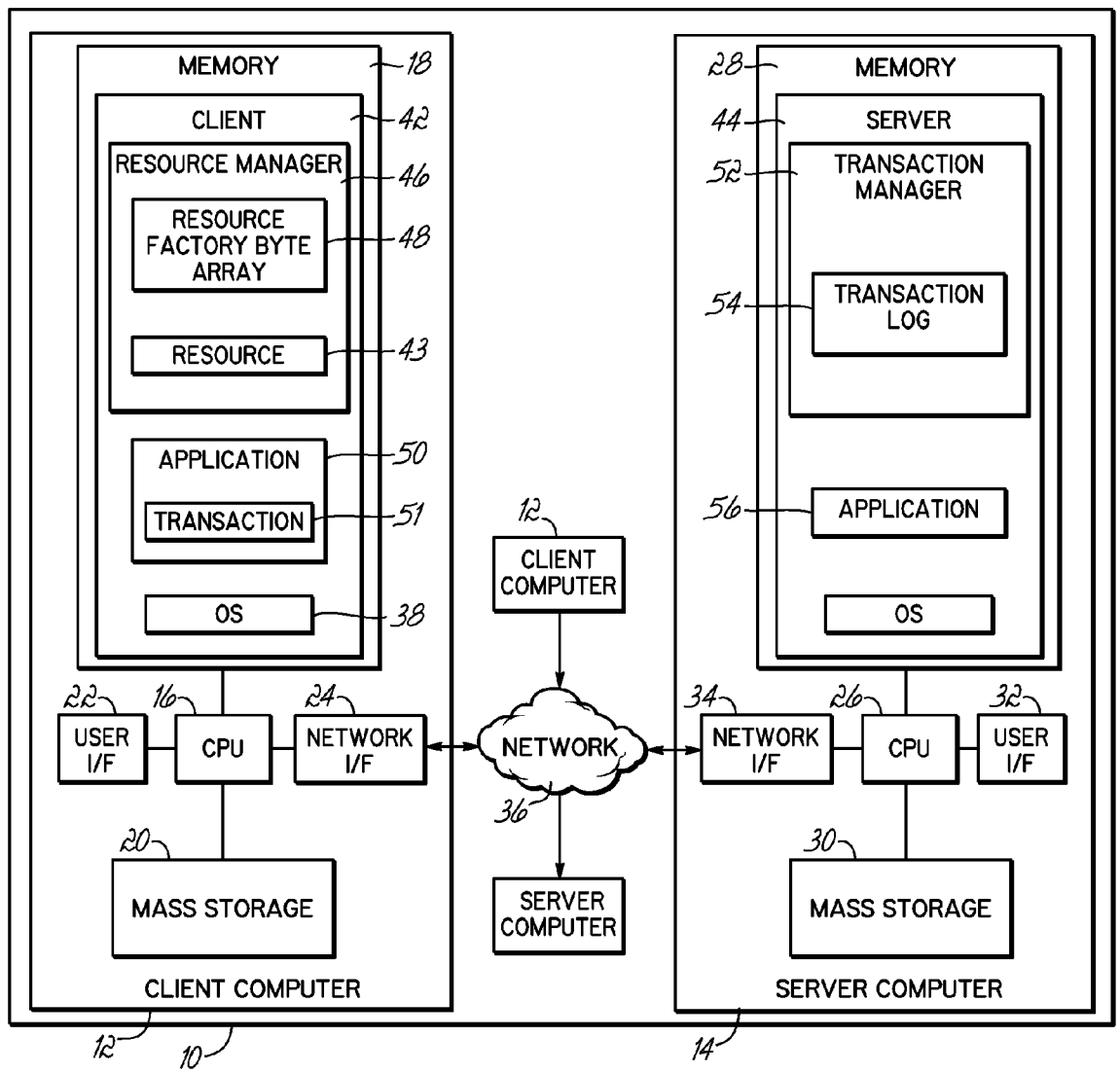
FIG. 1 is a block diagram of a client-server implementation of a computer system incorporating dynamic resource enlistment consistent with the principles of the present invention.

Turning now to the Drawings, wherein like numbers denote like parts throughout the several views, FIG. 1 illustrates an exemplary computer system 10 incorporating dynamic resource enlistment consistent with the principles of the present invention, implemented as a client-server based computer system or environment. System 10 includes at least one apparatus, e.g., one or more client computers 12 (e.g., client computer) and one or more server computers 14 (e.g., server computer). For the purposes of the invention, each computer 12, 14 may represent practically any type of computer, computer system or other programmable electronic device capable of functioning as a client and/or server in a client-server environment. Moreover, each computer 12, 14 may be implemented using one or more networked computers, e.g., in a cluster or other distributed computing system. Moreover, as is common in many client-server systems, typically multiple client computers 12 will be interfaced with a given server computer 14. Furthermore, in some embodiments, system 10 may be implemented as a peer-to-peer system or environment, where computer 12 may function as a client and/or server and computer 14 may function as a client and/or server.

Computer 12 typically includes a central processing unit 16 including at least one microprocessor coupled to a memory 18, which may represent the random access memory (RAM) devices comprising the main storage of computer 12, as well as any supplemental levels of memory, e.g., cache memories, non-volatile or backup memories (e.g., programmable or flash memories), read-only memories, etc. In addition, memory 18 may be considered to include memory storage physically located elsewhere in computer 12, e.g., any cache memory in a processor in CPU 16, as well as any storage capacity used as a virtual memory, e.g., as stored on a mass storage device 20 or on another computer coupled to computer 12.

In particular, resident in memory 18 is a computer program such as a client 42, and stored in client 42 is resource manager 46, a resource factory or byte array 48, and a resource 43. Resource 43 may be at least one of a database, a partition of a database, an object grid, a portion of an object grid, an object cache, a portion of an object cache, a partitioned memory database, a portion of a partitioned memory database, an XAResource, a virtual resource, etc. Resource factory or byte array 48 may be any structure capable of storing information about resource 43, including information about the state of each resource 43, as resource 43 is dynamically enlisted. Resource factory or byte array 48 may have an entry for each resource 43 that is dynamically enlisted. An application 50 may also be resident in server 42 and include at least one transaction 51.

Computer 12 also typically receives a number of inputs and outputs for communicating information externally. For interface with a user or operator, computer 12 typically includes a user interface 22 incorporating one or more user input devices (e.g., a keyboard, a mouse, a trackball, a joystick, a touchpad, and/or a microphone, among others) and a display (e.g., a CRT monitor, an LCD display panel, and/or a speaker, among others). Otherwise, user input may be received via another computer or terminal.

For additional storage, computer 12 may also include one or more mass storage devices 20, e.g., a floppy or other removable disk drive, a hard disk drive, a direct access storage device (DASD), an optical drive (e.g., a CD drive, a DVD drive, etc.), and/or a tape drive, among others. Furthermore, computer 12 may include an interface 24 with one or more networks (e.g., a LAN, a WAN, a wireless network, and/or the Internet, among others) to permit the communication of information with other computers and electronic devices. It should be appreciated that computer 12 typically includes suitable analog and/or digital interfaces between CPU 16 and each of components 18, 20, 22 and 24 as is well known in the art.

In a similar manner to computer 12, computer 14 includes a CPU 26, memory 28, a computer program such as an server 44, a transaction manager 52 and a transaction log 54 stored in server 44, mass storage 30, user interface 32 and network interface 34. An application 56 may also be resident in server 44. However, given the nature of computers 12 and 14 as client and server, in many instances computer 14 will be implemented using a multi-user computer such as a server computer, a midrange computer, a mainframe, etc., while computer 12 will be implemented using a desktop or other single-user computer. As a result, the specifications of the CPU's, memories, mass storage, user interfaces and network interfaces will typically vary between computers 12 and 14. Other hardware environments are contemplated within the context of the invention. Computers 12, 14 are generally interfaced with one another via a network 36, which may be public and/or private, wired and/or wireless, local and/or wide-area, etc. Moreover, network 36 may represent multiple, interconnected networks. In the illustrated embodiment, for example, network 36 may include the Internet.

Each computer 12, 14 operates under the control of an operating system 38, 40, and executes or otherwise relies upon various computer software applications, components, programs, objects, modules, data structures, etc. (e.g. client 42 and server 44). Moreover, various applications, components, programs, objects, modules, etc. may also execute on one or more processors in another computer coupled to computer 12, 14 via a network, e.g., in a distributed or client-server computing environment, whereby the processing required to implement the functions of a computer program may be allocated to multiple computers over a network.

In general, the routines executed to implement the embodiments of the invention, whether implemented as part of an operating system or a specific application, component, program, object, module or sequence of instructions, or even a subset thereof, will be referred to herein as "computer program code," or simply "program code." Program code typically comprises one or more instructions that are resident at various times in various memory and storage devices in a computer, and that, when read and executed by one or more processors in a computer, cause that computer to perform the steps necessary to execute steps or elements embodying the various aspects of the invention. Moreover, while the invention has and hereinafter will be described in the context of fully functioning computers and computer systems, those skilled in the art will appreciate that the various embodiments of the invention are capable of being distributed as a program product in a variety of forms, and that the invention applies equally regardless of the particular type of computer readable media used to actually carry out the distribution. Examples of computer readable media include, but are not limited to, physical, recordable type media such as volatile and non-volatile memory devices, floppy and other removable disks, hard disk drives, magnetic tape, optical disks (e.g., CD-ROMs, DVDs, etc.), among others, and transmission type media such as digital and analog communication links.

In addition, various program code described hereinafter may be identified based upon the application within which it is implemented in a specific embodiment of the invention. However, it should be appreciated that any particular program nomenclature that follows is used merely for convenience, and thus the invention should not be limited to use solely in any specific application identified and/or implied by such nomenclature. Furthermore, given the typically endless number of manners in which computer programs may be organized into routines, procedures, methods, modules, objects, and the like, as well as the various manners in which program functionality may be allocated among various software layers that are resident within a typical computer (e.g., operating systems, libraries, API's, applications, applets, etc.), it should be appreciated that the invention is not limited to the specific organization (e.g., components may be added and/or omitted) and allocation of program functionality described herein.

In the context of the invention, application 50 in client 42 may request that transaction 51 be executed. After execution begins, resource 43 may be dynamically enlisted by transaction manager 52. Specifically, when transaction manager 52 enlists resource 43 in the transaction, resource manager 46 may be given an additional callback from transaction manager 52. As such, connection information (e.g., a state representing an identifier of the resource) may be added to resource factory or byte array 48 in resource manager 46 as resource 43 is referenced in the transaction. Resource factory or byte array 48 of information from the callback may then be serialized with the transaction 51, sent to transaction manager 52, and serialized with transaction log 54. In some embodiments, the callback information may be provided to transaction manager 52 for the transaction log 54 about when transaction 51 is being committed.

When transaction manager 52 seeks to recover transaction 51 after an error, transaction manager 52 may inflate the factory from log 54. As such, transaction manager 52 may then provide the list of recovered resources from the transaction log 54 to a factory method to receive an array of resource objects (e.g., XAResource objects) on which 2PC may be invoked. To invoke 2PC, resource manager 46 may be utilized.

Those skilled in the art will recognize that the exemplary system illustrated in FIG. 1 is not intended to limit the present invention. Indeed, those skilled in the art will recognize that other alternative hardware and/or software environments may be used without departing from the scope of the invention.

Figure 2:
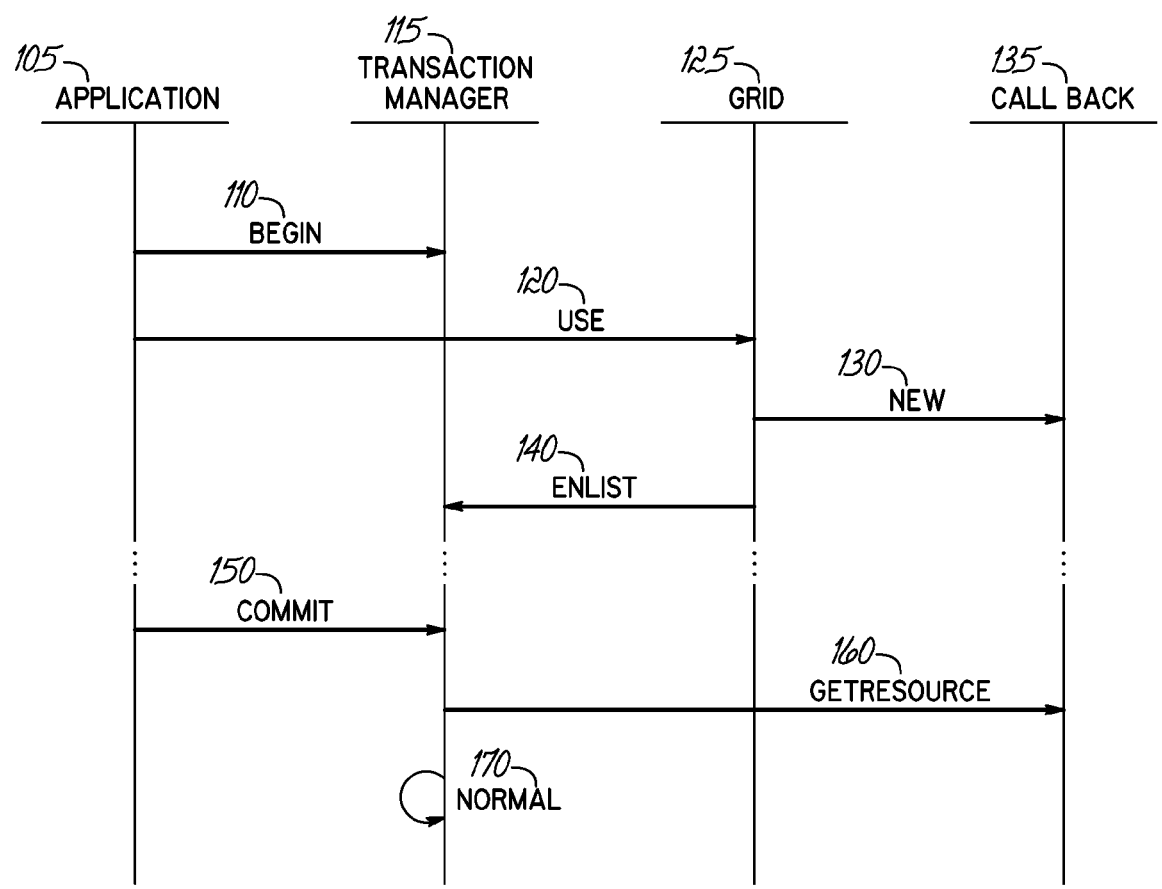
FIG. 2 is a flowchart illustrating an exemplary dynamic resource enlistment routine executed in the client-server computer system of FIG. 1.

Turning to FIG. 2, FIG. 2 is a flowchart illustrating an exemplary dynamic resource enlistment routine 100 executed within the distributed computer system of FIG. 1, and showing the interaction between an application 105 such as application 50, transaction manager 115 such as transaction manager 52, object grid 125, and callback 135. Application 105 makes a begin call 110 to transaction manager 115 to start a transaction. Next, application 105 makes a use call 120 to grid 125 to use grid 125. Object grid 125 represents other resources to be utilized by transaction 51.

Grid 125 makes a new call 130 to callback 135. As such, any new resources represented by the grid that are dynamically enlisted should be added to callback 135. In particular, information about the dynamically enlisted resources may be stored in resource factory or byte array 48 by callback 135. In some embodiments, information about the grid may also be stored in resource factory or byte array 48 by callback 135.

Specifically, callback 135 may be called to add some opaque state, which represents additional connection information as virtual resources such as the grid are referenced in the transaction. For example, a partitioned memory database like ObjectGrid may represent partition identifiers, such as where the resources are located, may be added to the resource factory or byte array 48 as they are enlisted in the transaction. The resulting list of opaque states may be serialized with the transaction 51 in transaction log 54 of the transaction manager 115.

Resource factory or byte array 48 may be a XAResource Factory with a new method XAResource create(Object state) or an array version of this (i.e., byte array 48). Nonetheless, the callback may be provided to resource manager 46 when enlist is invoked, and allows additional resource state to be associated with the transaction.

Next, as application 105 made a use call to grid 125, grid 125 may make an enlist call 140 to transaction manager 115 to enlist grid 125 in the transaction. The grid may be enlisted by being configured via conventional techniques. Specifically, a central service may know where different resources are located and may be utilized to configure the grid. However, the central server will typically not know which resources represented by the grid will be dynamically enlisted as those resources may not be known until the commit call 150. To utilize the central service, the middleware associated with the grid may interact with the central service. However, in some embodiments, the grid may be dynamically enlisted.

Nonetheless, grid 125 may be enlisted by transaction manager 115. Transaction manager 115 may have a new method to enlist the resource, and may have a signature such as void enlist(TX_XAR_LateEnlist callback). In particular, Java EE Connector Architecture (JCA) may be extended such that when transaction manager 115 enlists a resource in the transaction 51, resource manager 46 may be given an additional callback from transaction manager 115.

Next, application 105 makes a commit call 150 to transaction manager 115 to commit grid 125 in the transaction. In some embodiments, it may be at this point where the resource factory or byte array 48 of information from callback 135 may be serialized with the transaction 51, sent to transaction manager 115, and serialized with transaction log 54. Nonetheless, an extension of JCA may allow per transaction resource state to be stored in the transaction log 54. Those of ordinary skill in the art may appreciate that as there may only be one transaction log, and many transactions and many dynamically enlisted resources, it may be advantageous to store a per transaction resource state.

If transaction 51 has to be recovered for any reason, transaction manager 115 makes a get resource call 160 to callback 135. As such, a list of resources from resource factory or byte array 48 of the resources that were enlisted (e.g., each individual server that was touched during the transaction) may be utilized. In particular, the callback may return the resource factory or byte array 48 describing what was enlisted during transaction 51. The following methods may be utilized. Specifically, the TX_XAR_LateEnlist interface may have a method such as Resource[ ] getResourcesBeforeCommit( ) and Resource may be as follows: Resource {XAResource xar; XAResourceInfo xarinfo;}. The xarinfo values can be stored in the log as before and the XAResources can be utilized to perform 2PC logic (normal call 170) as conventionally performed. To perform 2PC, the byte codes, for example, may be converted to the resource and/or resource manager associated with that byte code. The get resource call 160 is thus helpful during recovery and as part of the routine 100. The get resource call 160 will be discussed further hereinbelow in FIG. 3 as part of routine 200.

Thus, callback may be called twice, the first time to store data and the second time to retrieve data. In particular, as the resources represented by grid 125 may only be known at about commit time at about commit call 150, the enlist call 140 may take a callback that is called later to get the list of XAR'S, for example, that were utilized in transaction 51. Moreover, as there may be many transactions in the transaction log, the transaction manager may restore on a per transaction basis and determine per transaction what resources were dynamically enlisted.

Figure 3:
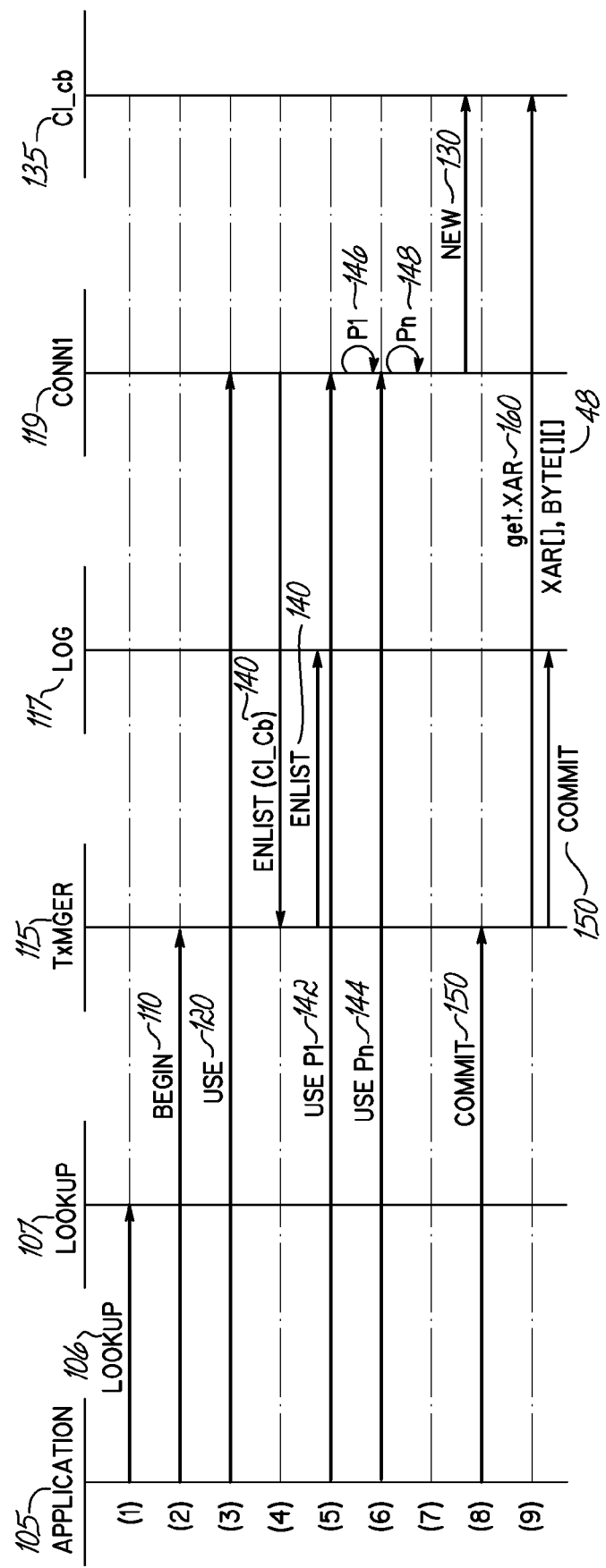
FIG. 3 is a flowchart illustrating an expanded view of the exemplary dynamic resource enlistment routine of FIG. 2.
Figure 4:
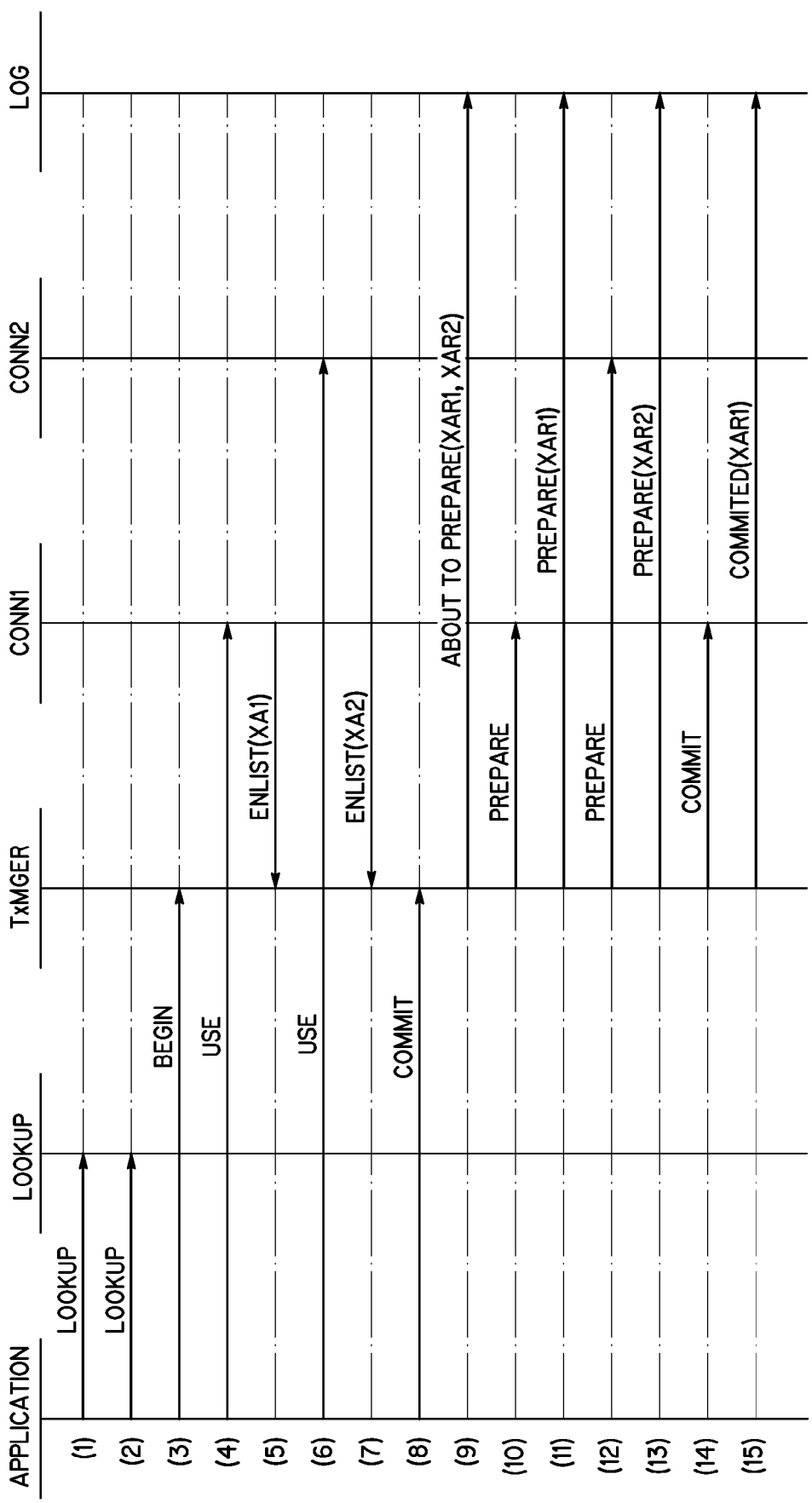
FIG. 4 is flowchart illustrating a conventional resource enlistment routine.

Turning to FIG. 3, routine 200 of FIG. 3 illustrates an expanded view of the exemplary dynamic resource enlistment routine 100 of FIG. 2. Application 105 makes a lookup call 106 to lookup 107 to find a transaction 51. Next, application 105 makes a begin call 110 to TxMger or transaction manager 115 to begin to use the transaction identified in lookup 107. Application 105 also makes a use call 120 to conn1 119, which is a connection associated with at least one resource such as object grid 125, to use the resource of conn1 119 in the transaction. Conn1 119 makes a new call 130 to Cl_cb or callback 135 and an enlist call 140 to TxMger 115 using Cl_cb 135. Next, the TxMger 115 may store in log 117 the resource that was enlisted. Thus, the log 117 may be written to after (4) as illustrated in FIG. 3.

Next, application 105 makes a use call 142 to use p1 of conn1 119. Conn1 119 makes a call 146 to p1 in conn1. Application 105 also makes a use call 144 to use pn of conn1 119 and a call 148 to pn in conn1. The p1 to pn may be processes that utilize the resource that was enlisted. Next, application 105 makes a commit call 150 to TxMger 115 to commit and TxMger 115 makes a get.XAR call or getResource call 160 to Cl_cb 135. The get.XAR call 160 may return arrays such as XAR[ ] and BYTE[ ][ ] (i.e., resource factory or byte array 48) to ensure that all members of the transaction are correct and that the commit may proceed. Next, the TxMger 115 may store in the log 117 the resource that was returned and committed. Thus, the log 117 may be written to after (9) as illustrated in FIG. 3.

In some embodiments, some of the steps illustrated in FIG. 3 may be repeated, such as repeating some of the steps before the commit in step (8). Specifically, steps (4) through before (8) may be repeated for every resource being enlisted. Furthermore, during each processing of steps (4) through before (8), at least one resource may be enlisted (e.g., only one resource may be enlisted during a single processing of the steps, a plurality of resources may be enlisted during a single processing of the steps, etc.). Thus, the number of resources enlisted during each processing of the steps may vary. During recovery, the log 117 may then be read and utilized to identify the resources of a transaction as well as other stored data in the log that may be pertinent to the transaction during recovery.

Those of ordinary skill in the art will appreciate that various modifications may be made consistent with the principles of the present invention. For example, information about the resource manager associated with each dynamically enlisted resource may be stored with the transaction that enlisted the resource. As such, a per resource manager state may be stored with the transaction.

Nonetheless, those of ordinary skill in the art may appreciate that although conventionally the grid simply has a XAResource/XAResourceInfo pair to enlist at the beginning, the resources in the grid that the application will enlist are generally not known at the time of enlistment of the grid. Yet, via the principles of the present invention, the callback will keep track of the individual resources represented by the grid that are dynamically enlisted. Thus, the per transaction resource state may be saved so as to create a record of the resources that are dynamically enlisted, even though these are not configured.

It will be appreciated that implementation of the functionality described herein within an XA or other distributed processing architecture would be well within the abilities of one of ordinary skill in the art having the benefit of the instant disclosure. Various additional modifications may be made to illustrated embodiments without departing from the spirit and scope of the invention. Therefore, the invention lies in the claims hereinafter appended.

What is claimed is:

1. A method of processing a transaction, the method comprising:

preconfiguring a first resource to be committed by the transaction during execution of the transaction using a transaction manager such that the first resource is known to the transaction manager prior to execution of the transaction;

after preconfiguring the first resource, executing the transaction using the transaction manager, including dynamically enlisting a plurality of resources to be committed by the transaction during execution of the transaction, wherein the plurality of resources includes a second resource for which the first resource is a proxy, and wherein the second resource is unknown to the transaction manager prior to execution of the transaction;

identifying the second resource to the transaction manager in response to dynamically enlisting the second resource; and storing information about each dynamically enlisted resource with the transaction in a transaction log, including storing information about a state of each dynamically enlisted resource, to facilitate recovery of the transaction.

2. The method of claim 1, wherein a resource in the plurality of resources is at least one of a database, a partition of a database, an object grid, a portion of an object grid, an object cache, a portion of an object cache, a partitioned memory database, a portion of a partitioned memory database, an XAResource, or a virtual resource.

3. The method of claim 1, wherein at least a portion of the plurality of resources are stored on different computers, wherein the different computers form a grid of computers.

4. The method of claim 1, wherein the information about each of the plurality of resources in the transaction log includes at least one of an identifier for the resource or a location of the resource.

5. The method of claim 1, wherein the information about each of the plurality of resources in the transaction log is organized in a serialized manner 6. The method of claim 1, further comprising performing a prepare operation on at least one of the resources in the plurality of resources during execution of the transaction, and updating the state of the resource in the transaction log to reflect a new state of the resource after the performance of the prepare operation.

7. The method of claim 1, further comprising performing a commit operation on at least one of the resources in the plurality of resources during execution of the transaction, and updating the state of the resource in the transaction log to reflect a new state of the resource after the performance of the commit operation.

8. The method of claim 1, wherein recovering the transaction further comprises:

performing a callback operation on the transaction log to identify the plurality of resources that has been enlisted for the transaction, and performing a rollback operation on at least one resource identified from the callback operation to re-enlist the resource.

9. The method of claim 8, in response to identifying at least one resource from the callback operation that has to be re-enlisted, further comprising:

utilizing the stored information about the resource to return the resource to its previous state; and re-enlisting the identified resource to execute the transaction.

10. The method of claim 1, wherein recovering the transaction further comprises:

performing a rollback operation;

maintaining a byte array in the transaction log with an entry for each resource in the plurality of resources; and utilizing the byte array to identify at least one resource that has to be re-enlisted.

11. The method of claim 1, wherein another transaction utilizes at least a portion of the plurality of resources, the method further comprising storing information about each of the plurality of resources enlisted by the other transaction with the other transaction, including a state of each resource, to facilitate recovery of the other transaction.

12. The method of claim 1, wherein the transaction is an XA transaction, and wherein execution of the transaction includes coordinating the enlistment of a resource with a resource manager for that resource.

13. An apparatus comprising:

a processor, a memory; and program code resident in the memory and configured to be executed by the processor to process a transaction by preconfiguring a first resource to be committed by the transaction during execution of the transaction using a transaction manager such that the first resource is known to the transaction manager prior to execution of the transaction, after preconfiguring the first resource, executing the transaction using the transaction manager, including dynamically enlisting a plurality of resources to be committed by the transaction during execution of the transaction, wherein the plurality of resources includes a second resource for which the first resource is a proxy, and wherein the second resource is unknown prior to the transaction manager prior to execution of the transaction, identifying the second resource to the transaction manager in response to dynamically enlisting the second resource, and storing information about each dynamically enlisted resource in the plurality of resources with the transaction in a transaction log, including storing information about a state of each dynamically enlisted resource, to facilitate recovery of the transaction.

14. The apparatus of claim 13, wherein a resource in the plurality of resources is at least one of a database, a partition of a database, an object grid, a portion of an object grid, an object cache, a portion of an object cache, a partitioned memory database, a portion of a partitioned memory database, an XAResource, or a virtual resource.

15. The apparatus of claim 13, wherein at least a portion of the plurality of resources are stored on different computers, wherein the different computers form a grid of computers.

16. The apparatus of claim 13, wherein the information about each of the plurality of resources in the transaction log includes at least one of an identifier for the resource or a location of the resource.

17. The apparatus of claim 13, wherein the information about each of the plurality of resources in the transaction log is organized in a serialized manner.

18. The apparatus of claim 13, wherein the program code is further configured to perform a prepare operation on at least one of the resources in the plurality of resources during execution of the transaction, and update the state of the resource in the transaction log to reflect a new state of the resource after the performance of the prepare operation.

19. The apparatus of claim 13, wherein the program code is further configured to a commit operation on at least one of the resources in the plurality of resources during execution of the transaction, and update the state of the resource in the transaction log to reflect a new state of the resource after the performance of the commit operation.

20. The apparatus of claim 13, wherein the program code is further configured to recover the transaction by performing a callback operation on the transaction log to identify the plurality of resources that has been enlisted for the transaction, and performing a rollback operation on at least one resource identified from the callback operation to re-enlist the resource.

21. The apparatus of claim 20, wherein the program code is further configured to respond to an identification of at least one resource from the callback operation that has to be re-enlisted by utilizing the stored information about the resource to return the resource to its previous state, and re-enlisting the identified resource to execute the transaction.

22. The apparatus of claim 13, wherein the program code is further configured to recover the transaction by performing a rollback operation, maintaining a byte array in the transaction log with an entry for each resource in the plurality of resources, and utilizing the byte array to identify at least one resource that has to be re-enlisted.

23. The apparatus of claim 13, wherein another transaction utilizes at least a portion of the plurality of resources, wherein the program code is further configured to store information about each of the plurality of resources enlisted by the other transaction with the other transaction, including a state of each resource, to facilitate recovery of the other transaction.

24. The apparatus of claim 13, wherein the transaction is an XA transaction, and wherein the program code is further configured to execute the transaction by coordinating the enlistment of a resource with a resource manager for that resource.

25. A program product, comprising:
program code resident in the memory and configured to be executed by the processor to process a transaction by preconfiguring a first resource to be committed by the transaction during execution of the transaction using a transaction manager such that the first resource is known to the transaction manager prior to execution of the transaction, after preconfiguring the first resource, executing the transaction using the transaction manager, including dynamically enlisting a plurality of resources to be committed by the transaction during execution of the transaction, wherein the plurality of resources includes a second resource for which the first resource is a proxy, and wherein the second resource is unknown prior to the transaction manager prior to execution of the transaction, identifying the second resource to the transaction manager in response to dynamically enlisting the second resource, and storing information about each dynamically enlisted resource in the plurality of resources with the transaction in a transaction log, including storing information about a state of each dynamically enlisted resource, to facilitate recovery of the transaction; and
a computer readable medium bearing the program code.

26. A method of processing a transaction, the method comprising:
executing the transaction, including enlisting a plurality of resources to be committed by the transaction during execution of the transaction using a transaction manager, wherein at least one resource of the plurality of resources is a virtual resource, and the virtual resource serves as a proxy for other resources that are unknown to the transaction manager prior to execution of the transaction;
dynamically enlisting a first resource for which the virtual resource serves as a proxy during execution of the transaction, and generating information about the first resource, the information including information about a state of the first resource; and
storing the information about the first resource with the transaction in a transaction log.

27. The method of claim 26, wherein the virtual resource comprises an object grid.

* * * * *